United States Patent
Liu et al.

(10) Patent No.: US 7,083,869 B2
(45) Date of Patent: Aug. 1, 2006

(54) METHODS OF FORMING LANIO$_3$ CONDUCTIVE LAYERS, FERRO-ELECTRIC DEVICES WITH LANIO$_3$ LAYERS, AND PRECURSOR FORMATION SOLUTIONS

(75) Inventors: Kuo-Chuan Liu, Fremont, CA (US); Michael G. Lee, San Jose, CA (US); Kishio Yokouchi, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/807,605

(22) Filed: Mar. 23, 2004

(65) Prior Publication Data

US 2005/0211135 A1    Sep. 29, 2005

(51) Int. Cl.
*B32B 9/00* (2006.01)
*H01L 41/187* (2006.01)

(52) U.S. Cl. ............ 428/701; 428/697; 428/699; 428/700; 428/702; 252/62.9 R; 252/62.9 PZ (58) Field of Classification Search ............... 428/699, 428/702
See application file for complete search history.

(56) References Cited

U.S. PATENT DOCUMENTS

| | | | |
|---|---|---|---|
| 5,798,903 A * | 8/1998 | Dhote et al. ............ | 361/321.4 |
| 6,093,338 A * | 7/2000 | Tani et al. ............ | 252/62.9 R |
| 6,531,235 B1 * | 3/2003 | Lee et al. ............ | 428/702 |
| 6,893,912 B1 * | 5/2005 | Lung ............ | 438/240 |

OTHER PUBLICATIONS

K.M. Satyalakshmi, et al., "Epitaxial metallic LaNiO$_3$ thin films grown by pulsed laser deposition," *Appl. Phys. Lett.* 62:11 (1993) 1233-1235.

C.C. Yang, et al., "Preparation of (100)-oriented metallic LaNiO$_3$ thin films on Si substrates by radio frequency magnetron sputtering for the growth of textured Pb(Zr$_{0.53}$Ti$_{0.47}$) O$_3$," *Appl. Phys. Lett.* 66:20 (1995) 2643-2645.

Y.L. Tu, et al., "Synthesis and Electrical Characterization of Thin Films of PT and PZT Made from a Diol-Based Sol-Gel Route," *J. Am. Ceram. Soc.* 79:2 (1996) 441-448.

A. Li, et al., "Preparation of perovskite conductive LaNiO$_3$ films by metalorganic decomposition," *Appl. Phys. Lett.* 68:10 (1996) 1347-1349.

M.S. Chen, et al., "Effect of textured LaNiO$_3$ electrode on the fatigue improvement of Pb(Zr$_{0.53}$Ti$_{0.47}$)O$_3$ thin films," *Appl. Phys. Lett.* 68:10 (1996) 1430-1432.

(Continued)

*Primary Examiner*—Cathy F. Lam
(74) *Attorney, Agent, or Firm*—Sheppard Mullin Richter & Hampton LLP (57) ABSTRACT

Methods of forming lanthanum nickel oxide (LaNiO$_3$) layers with precursor formation solutions are disclosed, along with devices made from such solutions. Also disclosed are methods for making the formation solutions using lanthanum, nickel, and a diol. The present invention enables the manufacture of LaNiO$_3$ layers at low cost, with good resistivity properties, and a surface morphology suitable for interfacing to a ferro-electric material.

9 Claims, 8 Drawing Sheets

OTHER PUBLICATIONS

T.F. Tseng, et al., "Effect of $LaNiO_3$/Pt double layers on the characteristics of $(Pb_xLa_{1-x})(Zr_y Ti_{1-y})O_3$ thin films," *Appl. Phys. Lett.* 68:18 (1996) 2505-2510.

A. Li, et al., "Preparation of epitaxial metallic $LaNiO_3$ films on $SrTiO_3$ by metalorganic decomposition for the oriented growth of $PbTiO_3$," *Appl. Phys. Lett.* 69:2 (1996) 161-163.

T. Yu, et al., "Epitaxial $Pb(Zr_{0.53}Ti_{0.47})O_3/LaNiO_3$ heterostructures on single crystal substrates," *Appl. Phys. Lett.* 69:14 (1996) 2092-2094.

Y.L. Tu, et al., "Processing and characterization of Pb(Zr, Ti)$O_3$ films, up to 10 μm thick, produced from a diol sol-gel route," *J. Mater. Res.* 11:10 (1996) 2556-2564.

A. Li, et al., "Fabrication and electrical properties of sol-gel derived $BaTiO_3$ films with metallic $LaNiO_3$ electrode," *Appl. Phys. Lett.* 70:12 (1997) 1616-1618.

C. R. Cho, et al., "Solution deposition and heteroepitaxial crystallization of $LaNiO_3$ electrodes for integrated ferroelectric devices," *Appl. Phys. Lett.* 71:20 (1997) 3013-3015.

R. Kurchania, et al., "Synthesis of (Pb,La) (Zr,Ti)$O_3$ films using a diol based sol-gel route," *J. Mater. Sci.* 33 (1998) 659-667.

C.H. Lin, et al., "Domain structure and electrical properties of highly textured $PbZr_xTi_{1-x}O_3$ thin films grown on $LaNiO_3$-electrode-buffered Si by metalorganic chemical vapor deposition," *J. Mater. Res.* 15:1 (2000) pp. 115-124.

S.S. Kim, et al., "Structures and properties of (001)-oriented Pb(Zr,Ti)$O_3$ films on $LaNiO_3$/Si(001) substrates by pulsed laser deposition," *J. Mater. Res.* 15:12 (2000) 2881-2886.

G.S. Wang, et al., "Properties of highly (100) oriented $Ba_{0.9}Sr_{0.1}TiO_3/LaNiO_3$ heterostructures prepared by chemical solution routes," *Appl. Phys. Lett.* 78:26 (2001) 4172-4174.

* cited by examiner

FIG. 12A (Invention Example on LaAlO3)

FIG. 12C (Comparative Example on LaAlO3)

FIG. 12B (Invention Example on SrTiO3)

FIG. 12D (Comparative Example on SrTiO3)

METHODS OF FORMING LANIO₃ CONDUCTIVE LAYERS, FERRO-ELECTRIC DEVICES WITH LANIO₃ LAYERS, AND PRECURSOR FORMATION SOLUTIONS

FIELD OF THE INVENTION

The present invention relates to thin-film structures that comprise a ferro-electric material disposed over a non-amorphous conductive layer, and methods for making the same. The structures may comprise electrical, magnetic, electro-optic, electromagnetic, and electromechanical devices. The present invention more particularly relates to lanthanum-modified lead zirconium titanate (PLZT) disposed over metallic lanthanum nickel oxide ($LaNiO_3$).

BACKGROUND OF THE INVENTION

Several types of optical communication devices comprise optical waveguides, optical modulators, and optical switching structures made of electro-optic material. A substrate optical waveguide comprises a lower cladding layer formed on the substrate, a core layer having a higher index of refraction formed over the lower cladding layer, and usually an upper cladding layer formed over the core layer. An optical modulator, or an optical switching structure, may be formed in line with the optical waveguide by forming a body of electro-optic (E/O) material on the same level as the core material, with the electro-optic material usually sandwiched between upper and lower cladding layers. Two electrodes are formed on opposing surfaces of the body E/O material, and are used to apply an electric field to the E/O body. The electric field changes selected optical properties (e.g., refractive index, polarization) of the E/O material. The changes in optical properties may be used to achieve various types of modulating, switching, and filtering functions.

A coefficient may be used to relate the change in the optical property of the material with respect to the applied electric field (i.e., the applied voltage divided by the dimension of the material along which the voltage acts). Electro-optic materials are usually crystalline materials or highly ordered materials (as in the case of polymers). In both cases, the value of the electro-optic coefficient usually depends upon the direction of the electric field relative to the orientation of the material's crystal or highly-ordered structure. Because of this, the electro-optic property is usually specified as a matrix of coefficient values, each of which is measured along a different axis of the material's crystal or ordered structure. This matrix is often called the tensor matrix of the material's property.

In electro-optic devices used in large systems integrated on substrate carriers, the E/O material usually comprises an inorganic single crystalline material, such as lithium niobate, which is difficult to grow and pattern. However, such single crystalline materials have relatively low responses to the applied electric field compared to other inorganic crystalline materials, such as lanthanum-modified lead zirconium titanate (PLZT). But such crystalline materials cannot be easily formed on substrate carriers, and must be grown on top of a base crystalline substrate in order to cause the material to form a crystalline structure. This precludes using the crystalline materials in small-scale modulators and switching devices that have vertically oriented electrodes (top and bottom electrodes) since the material cannot be grown over the bottom electrode. Thus, the potential of using inorganic crystalline materials in these devices cannot be realized. The inventors have thought of, and considered, an approach of making large-sized optical modulators and switches that comprises the steps of: (1) forming 100 μm thin wafers of inorganic E/O material, (2) followed by coating top and bottom surfaces with metal, (3) dicing the substrate into small pieces, and (4) then bonding the bottom surfaces of the pieces to metal pads on the substrate carrier, which will hold all of the electro-optic devices. However, this approach is not currently able to construct small-sized electro-optic switches and modulators (less than 10 μm in thickness and width), and is not practical for large-scale integration of electro-optic devices. This approach is a conception of the inventors, and does not form a part of the prior art to the inventors' knowledge.

Figure 1:
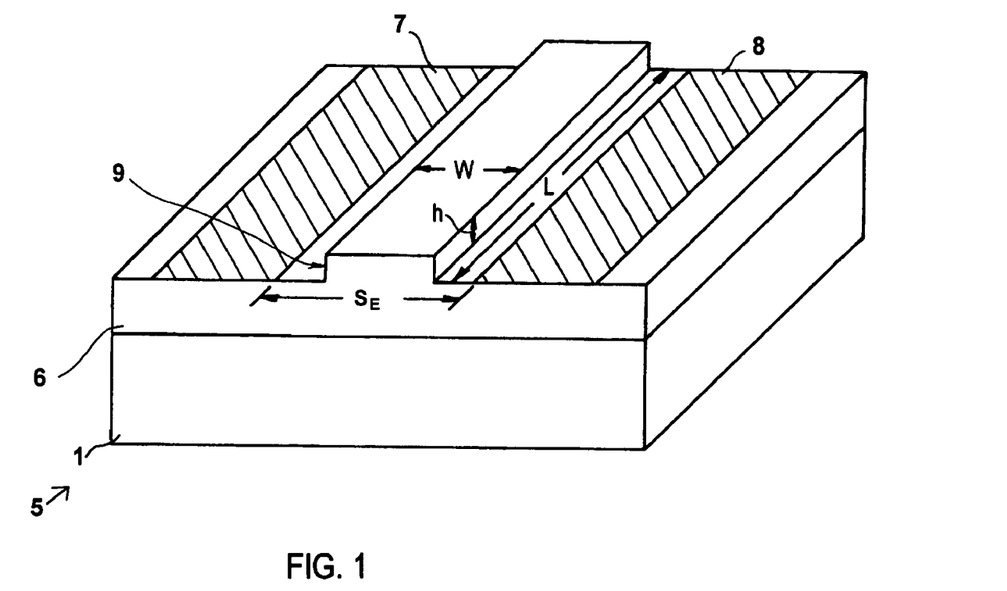
FIG. 1 shows a perspective view of a device according to the prior art.

FIG. 1 shows a part 5 of a prior art electro-optic device that uses inorganic crystalline material or inorganic polycrystalline material 6 and two electrodes 7 and 8. Part 5 may be incorporated into an interferometer-type optical switch or a polarization-type modulator. Inorganic E/O material 6 is grown as a layer over a dielectric crystalline substrate 1. The crystal lattice constant of E/O material layer 6 and substrate 1 are closely matched, and material 6 is grown with a crystal orientation that is set by the crystal orientation of substrate 1. After E/O material layer 6 is initially formed, it is pattern-etched to form a mesa ridge 9 between the locations where electrodes 7 and 8 are to be formed. Mesa ridge 9 has a width W, a length L, and a height h. In use, a light beam will be conveyed through mesa 9 along the length L. E/O material 6 of mesa 9 has a refractive index that is higher than that of substrate 1, and higher than that of the air above mesa 9 (in this case, the air effectively acts as an upper cladding layer). The higher refractive index provides vertical confinement of the light beam within mesa 9. The step difference in height h causes the refractive index of the material 6 underneath mesa 9 to be higher than that of material 6 that is to the side of mesa 9, which provides lateral confinement of the light beam within mesa 9. After mesa 9 is formed, electrodes 7 and 8 are formed, and are separated by a distance $S_E$. The electrodes generate an electric field along distance $S_E$, which can then be used to modify the optical properties (e.g., refractive index, polarization) of E/O material 6 within the lower part of mesa 9. Unfortunately, the direction of this electric field is usually oriented along one of the smaller coefficients of the material's tensor matrix, which requires one to use a higher voltage between electrodes 7 and 8 to achieve a desired change in optical properties. In addition, because the spacing distance $S_E$ is usually on the order of 6 μm to 10 μm, and because the electrodes are oriented parallel to the lines of the electric field, the effective separation distance of the electrodes for generating the electric field is on the order of 8 μm to 12 μm. This large effective distance also increases the amount of voltage needed. The requirement for higher voltage reduces the modulation rate or switching rate of the electro-optic device that incorporates part 5.

Accordingly, the inventors have recognized that electro-optic devices with higher modulation/switching rates could be made if the above problems were solved.

SUMMARY OF THE INVENTION

The inventors have recognized that there is a need in the art to provide for reliable integration of crystalline ferro-electric materials onto substrates, and more particularly onto conductive layers formed on the substrates. Such integration would enable the use of vertically-oriented electrodes (as opposed to conventional top electrodes), which in turn could exploit higher E/O coefficient values in the material's tensor matrix, and also provide shorter spacing distances between the electrodes that are to generate the electric field.

The present invention provides thin-film structures and methods for making the same, with the structures comprising a non-amorphous conductive layer, which in turn can support and interface with a layer of a ferro-electric material. The non-amorphous bottom conductive layer may have a crystalline structure, or a semi-crystalline structure (e.g., a body of large grains of crystalline material). A preferred exemplary structure comprises metallic lanthanum nickel oxide ($LaNiO_3$) as the non-amorphous bottom conductive layer, which is advantageous for interfacing to a lanthanum-modified lead zirconium titanate (PLZT) layer disposed over it. In making their invention, the inventors have recognized that a structure can be configured to enable the construction of vertically-oriented electrodes of high quality if one is able to provide a bottom electrode that has a crystal lattice that substantially matches the crystal lattice of the ferro-electric material (e.g., a ferro-electric oxide, PLZT), that also has a smooth surface morphology to assist the formation of subsequent layers, and that has suitable chemical compatibility to enhance adhesion to the substrate. The present invention is directed to methods for enabling the fabrication of such electrodes, and to the resulting devices.

One preferred aspect of the present invention comprises a method of forming a $LaNiO_3$ layer. The method comprises coating a substrate with a liquid solution that comprises a solvent and a chelated complex having lanthanum atoms, nickel atoms, and one or more diol compounds, to form a material layer. As used herein and in the claims, the term "diol" has its ordinary and customary meaning in the chemical art, that of any alcohol molecule having two hydroxyl groups. As used herein, a diol compound comprises a diol molecule absent one or both hydrogen atoms of the hydroxyl groups. Thereafter, the material layer is heated to a temperature above room temperature (20° C.) to evaporate off the solvent. Next, the material layer is heated to a temperature of 500° C. or more in an oxygen atmosphere to decompose the diol compound and to form a layer of $LaNiO_3$. This step is called the firing stage. A ferro-electric material may then be formed over the $LaNiO_3$ layer by any available method. In this preferred aspect, the diol of the diol compound comprises 1,3-propanediol.

Another preferred aspect of the present invention comprises methods of forming a solution that includes lanthanum atoms, nickel atoms and a diol compound, such as a diol compound of 1,3-propanediol. An exemplary method comprises dissolving lanthanum acetylacetonate in a diol, such as 1,3-propanediol, and reacting the components to form a first solution having molecules that include lanthanum atoms and diol compounds, with at least some of the diol compounds being bonded to the coordinate sites of the lanthanum. The method further comprises dissolving nickel acetate in a diol, such as 1,3-propanediol, and 2,4-pentanedione, and reacting the components to form a second solution having molecules that include nickel atoms and diol compounds, with at least some of the diol compounds being bonded to the coordinate sites of the nickel. The method further includes combining the first and second solutions.

The inventors have found that the complexes formed between the metal atoms and the diol compounds comprise linear chains. The linear chain structure provides for an advantageous distribution of lanthanum and nickel atoms on the substrate surface prior to the firing stage, which leads to formation of crystal grains having improved electrical conductivity. In comparison to epitaxial deposition approaches, the present invention enables a lower-cost method of making the bottom electrodes.

Accordingly, it is an object of the present invention to provide improved methods of forming non-amorphous conductive films suitable for interfacing with ferro-electric materials.

It is another object of the present invention to enable these non-amorphous conductive films to be manufactured with improved control over composition and stoichiometry.

It is another object of the present invention to enable these non-amorphous conductive films to be manufactured with reduced electrical conductivity.

It is yet another object of the present invention to enable simple and low-cost methods of constructing these non-amorphous conducting films.

It is a further object of the present invention to enable the construction of electrical, optical, magnetic, and/or micro-mechanical devices on substrates, and to enable the construction of such devices with vertically-oriented electrodes.

These and other objects of the present invention will become apparent to one of ordinary skill in the art from the present specification and drawings.

DETAILED DESCRIPTION OF THE INVENTION

Electro-optical (E/O) thin-film planar waveguides comprising transparent ferro-electric materials, such as lanthanum-modified lead zirconium titanate (PLZT), could potentially have substantially better performance than other electro-optical materials because of the material's large electro-optic coefficients. However, this material cannot be grown over conventional electrode materials, and so the alternative has been to use lateral electrodes (the type shown in FIG. 1), which have the above-noted disadvantages.

In order to produce an electro-optical device that can utilize different components of the PLZT's coefficient tensor and that can have closely spaced electrodes, the inventors have recognized that a structure with vertically-oriented electrodes should be used. When constructing such a structure, the inventors have further recognized that the bottom electrode should have a crystal lattice that matches to the substrate beneath, and further matches to the ferro-electric material disposed above. Moreover, the inventors have recognized that the bottom electrode should have a smooth surface morphology to maintain the quality of subsequent coatings and suitable chemical compatibility to enhance the adhesion of the layers. Thus, preparing the bottom electrode is a critical step in constructing E/O devices when vertically-oriented electrodes and non-amorphous materials are used.

The inventors have recognized that lanthanum nickel oxide (LaNiO$_3$), which is a perovskite-type metallic oxide having a pseudo-cubic structure with a lattice parameter of 3.84 Å, may be useful as a bottom electrode for many ferro-electric materials. LaNiO$_3$ can be formed by RF magnetron sputtering, pulsed laser deposition (PLD), metal-organic chemical vapor deposition (MOCVD), metal-organic decomposition (MOD) and chemical solution deposition (CSD). However, the inventors have found that these methods are expensive and/or currently lack the ability to control the stoichiometry of the deposited material to the degree needed for the above-described bottom electrode. The inventors have developed a different manufacturing approach. In this approach, lanthanum and nickel atoms are incorporated with diol compounds in a chelated complex to form a dispensing solution. The dispensing solution is disposed over a substrate, preferably pre-baked to remove (evaporate) solvents, and then fired at a high temperature under oxygen flow conditions. The pre-bake is preferably performed at temperatures between about 200° C. and about 400° C., inclusive of these values, for a time sufficient to remove the solvents (which generally depends upon layer thickness and solvent content). The pre-bake time is generally in the range of one minute to several minutes.

Figure 2:
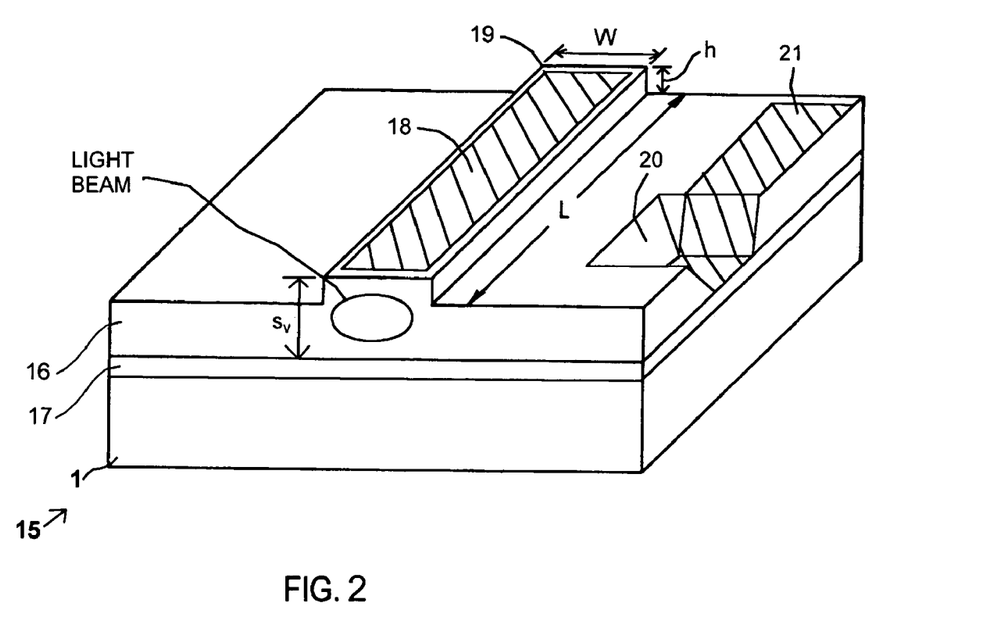
FIG. 2 shows a perspective view of an exemplary device according to the present invention.

FIG. 2 shows a part 15 of an electro-optic device according to the present invention that uses inorganic crystalline material or inorganic poly-crystalline material 16 and two vertically-oriented electrodes: bottom electrode 17 and top electrode 18. Part 15 may be incorporated into an interferometer-type optical switch, a polarization-type modulator, as well as other types of devices. Bottom electrode 17 preferably comprises lanthanum nickel oxide (LaNiO$_3$), which is conductive, and is formed over a dielectric crystalline substrate 1 by methods described in greater detail below. Bottom electrode 17 comprises grains of crystalline material (i.e., is non-amorphous), with the crystal lattice constant being closely matched to that of substrate 1, and with the crystal orientation of the grains closely following the crystal orientation of substrate 1. Inorganic E/O material 16 preferably comprises PLZT, and is grown as a layer over bottom electrode 17 by any of the available formation methods. In preferred embodiments, E/O material 16 is preferably formed by methods that form grains of material having substantially the same crystal orientation, such as by MOCVD (metallorganic chemical vapor deposition), PLD (pulsed laser deposition), sputtering or sol-gel processes. In this case, the crystal lattice constant of E/O material layer 16 is closely matched to the crystal lattice constants of both of substrate 1 and bottom electrode 17.

After E/O material layer 16 is initially formed, it is pattern-etched to form a mesa stripe 19 having a width W, a length L, and a height h. In use, a light beam will be conveyed through mesa stripe 19 along the length L. E/O material layer 16 of mesa stripe 19 has a refractive index that is higher than that of substrate 1, and higher than that of the air above mesa stripe 19 (in this case, the air effectively acts as an upper cladding layer). The higher refractive index provides vertical confinement of the light beam within the space below the top of mesa stripe 19. The step difference in height h causes the refractive index of the material layer 16 underneath mesa stripe 19 to be higher than that of the material layer 16 to the side of mesa stripe 19, which provides lateral confinement of the light beam within the space below the top of mesa stripe 19. After mesa stripe 19 is formed, an aperture 20 is formed through E/O material layer 16, to the side of mesa stripe 19, so as to expose a portion of bottom electrode 17. Finally, top electrode 18 is formed over the top surface of mesa stripe 19, and a conductive layer 21 is formed through via 20 so as to contact the exposed portion of bottom electrode 17. In this configuration, a voltage may be applied between top electrode 18 and bottom electrode 17 by providing the voltage to electrode 18 and conductive line 21.

The separation distance between electrodes 17 and 18 through mesa 19 is indicated as distance $S_V$ in FIG. 2. This distance is significantly shorter than the electrode spacing distance $S_E$ shown in the prior art device of FIG. 1, and can be less than 2 μm. Thus, electrodes 17 and 18 can generate the same magnitude of electric field as in the device shown in FIG. 1, but using a significantly lower voltage. In addition, for many ferro-electric materials, the vertical orientation of electrodes 17 and 18 is aligned with a larger E/O coefficient of the material's tensor matrix, which causes the material to undergo a greater change in optical properties for the same level of electric field. Accordingly, with the topology for the present invention, electro-optic devices that are more efficient, more responsive, and more compact can be made. Furthermore, the topology of the present invention enables large-scale integration of electro-optic devices on a single carrier substrate (e.g., substrate 1). In this regard, a pattern etch may be applied to bottom electrode 17 before E/O material layer 16 is formed so as to electrically isolate the bottom electrodes of various devices from one another. In addition, the topology of the present invention may be used in various electrical, magnetic, electro-optic, electromagnetic, and electromechanical devices.

Figure 3:
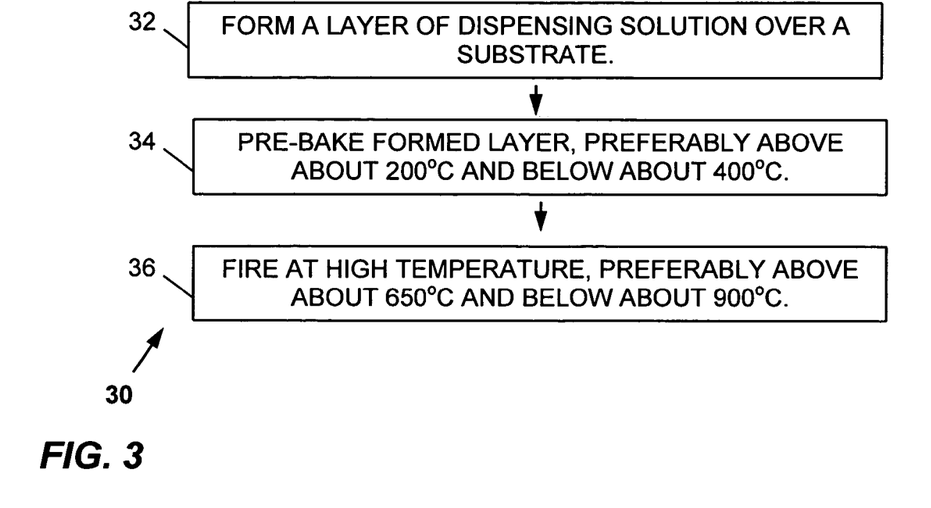
FIG. 3 shows a flow diagram of an exemplary method of forming a bottom $LaNiO_3$ electrode layer according to the present invention.

Bottom electrode 17 is preferably formed by coating substrate 1 with a viscous liquid that comprises equal amounts of lanthanum and nickel atoms in a mixture of chelated complexes and solvent(s), which will be described below in greater detail. FIG. 3 shows a flow diagram 30 of an exemplary method of forming bottom $LaNiO_3$ electrode layer, and the coating step is generally indicated at reference number 32. The coating is preferably done by spin coating, but other formation methods may be used. The coated layer is then pre-baked to remove the solvents that are in the viscous liquid, which is indicated at step 34 in FIG. 3. The pre-bake temperature is generally set at a value slightly to moderately above the boiling point of the solvents. Typically, the pre-bake is performed above about 200° C. and below about 400° C., inclusive of these values, for a time sufficient to remove the solvents (which generally depends upon layer thickness and solvent content). The time is generally in the range of one minute to several minutes. Next, as indicated in step 36, the layer is fired at (i.e., heated to) a high temperature in an oxygen-rich environment (i.e., under oxygen flow). The firing temperature is typically between 600° C. and 900° C., and is preferably between 700° C. and 800° C. Both the pre-bake and firing steps may be performed within a rapid thermal process furnace (RTP) with quartz chamber under oxygen flow. To achieve a smoother surface morphology, the above coating, pre-bake, and firing steps are repeated one or more times. The firing step decomposes the organic components in the metal complexes originally present in the dispensing solution, and causes the metal atoms and oxygen atoms to form crystal grains of $LaNiO_3$. A higher firing temperature generally provides better crystal formation in the $LaNiO_3$ layer. The firing time is generally on the order of 5 minutes to 25 minutes, with 15 minutes being a median value.

Figure 4:
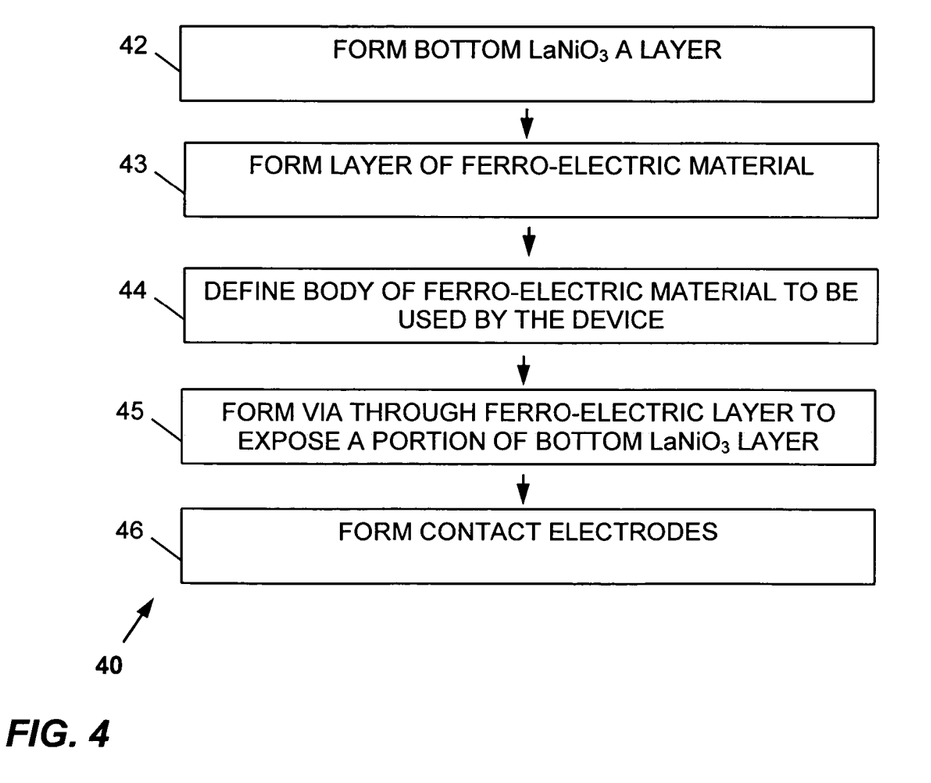
FIG. 4 shows a flow diagram of an exemplary method according to the present invention of forming the exemplary device shown in FIG. 2.

FIG. 4 shows a flow diagram of an exemplary method according to the present invention of forming the device shown in FIG. 2. In step 42, the bottom $LaNiO_3$ electrode layer is formed according to the above steps outlined in FIG. 3. In step 43, a layer of ferro-electric material is formed over the $LaNiO_3$ layer, such as lanthanum-modified lead zirconium titanate (PLZT), which may be formed by such methods as: MOCVD, PLD, sputtering, and sol-gel process. In step 44, a body of ferro-electric material) to be used by the device (e.g., the mesa structure shown in FIG. 2) is defined from the layer, such as by using conventional photo-lithographic steps. Such steps can include forming a photoresist layer, patterning the photoresist layer to expose parts of the ferro-electric layer, etching the exposed parts of the ferro-electric layer, and thereafter stripping the photoresist layer. In the next step, step 45, a via (e.g., via 20) is formed in the ferro-electric layer to provide for subsequent electrical contact to the bottom $LaNiO_3$ layer. Step 45 may comprise the steps of forming a photoresist layer, patterning the photo- resist layer to expose parts of the ferro-electric layer, etching the exposed parts of the ferro-electric layer, and thereafter stripping the photoresist layer. In many cases, steps 44 and 45 may be performed simultaneously using a common photoresist layer and a common photoresist mask, and using a common etchant. In the last step, step 46, a contact electrode (e.g., 18) is made to the body of ferro-electric material, and a contact electrode (e.g., 21) is made through the via to bottom $LaNiO_3$ layer. Various methods of metal layer formation may be used, including additive methods and subtractive methods (e.g., lift-off processes).

INVENTION EXAMPLES 1 AND 2

Figure 5:
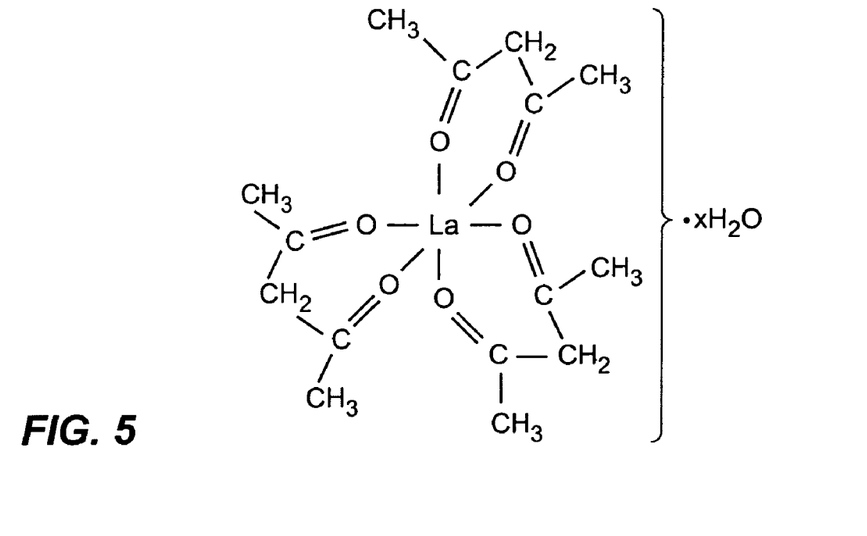
FIG. 5 shows the generally accepted general chemical structure (in quasi three-dimensional form) of lanthanum acetylacetonate hydrate before a drying step of an exemplary method according to the present invention.

A first lanthanum nickel oxide sol-gel precursor was prepared by using 1,3-propanediol (diol). Lanthanum acetylacetonate hydrate (Aldrich) and nickel acetate tetrahydrate (98%, Aldrich), in a 1:1 molar ratio to one another, were separately dried at 75° C. for 8 hours under vacuum. FIG. 5 shows the generally accepted general chemical structure (in quasi three-dimensional form) of lanthanum acetylacetonate hydrate before the drying step, where a variable number of water molecules (denoted by "x") are loosely adhered to parts of the lanthanum acetylacetonate molecule (but not directly to the center lanthanum atom). In the lanthanum acetylacetonate molecule, the lanthanum forms six bonds to six respective acetylacetone groups (molecules). After the drying step, the loosely-adhered water molecules are substantially removed from the lanthanum acetylacetonate molecules.

Figure 6:
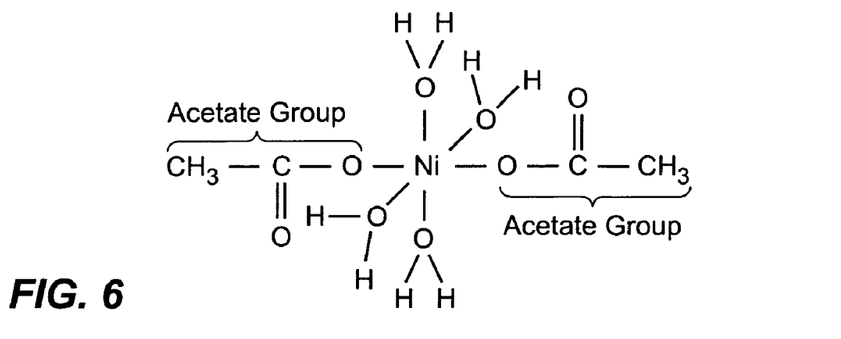
FIG. 6 shows the generally accepted general chemical structure (in quasi three-dimensional form) of nickel acetate tetrahydrate before a drying step of an exemplary method according to the present invention.
Figure 7:
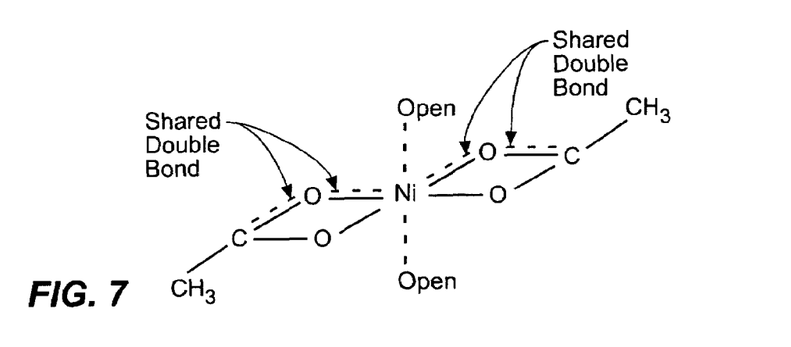
FIG. 7 shows a representation of the general chemical structure of the resulting nickel acetate molecule (in quasi three-dimensional form) after a drying step of an exemplary method according to the present invention.

FIG. 6 shows the generally accepted general chemical structure of nickel acetate tetrahydrate (in quasi three-dimensional form) before the drying step. The nickel atom forms two ionic bonds to two respective acetate groups, and four empty coordination sites are filled with four respective water molecules with the electrons of the oxygen atoms of these water molecules. FIG. 6 shows the case where the acetate groups are opposed to one another (180-degree angle), which is the most stable format due to the low free energy. After the drying step, the water molecules are detached from the nickel atom. FIG. 7 shows a representation of the general chemical structure of the resulting nickel acetate molecule (in quasi three-dimensional form). Each acetate group remains bonded to the nickel atom through the oxygen molecule that has single bonds to the center carbon atom and the nickel atom, respectively. However, the oxygen atom that was previously double bonded to the center carbon atom now shares one of its double bonds with both the center carbon atom and the nickel atom. Finally, the nickel atom has two open sites left for coordinate covalent bonds, which the inventive process will use to build the lanthanum-nickel chelated complex. FIG. 7 shows the case where the two open sites are opposed to one another (180-degree angle), which is the most stable structure of this molecule due to its low free energy.

Figure 8:
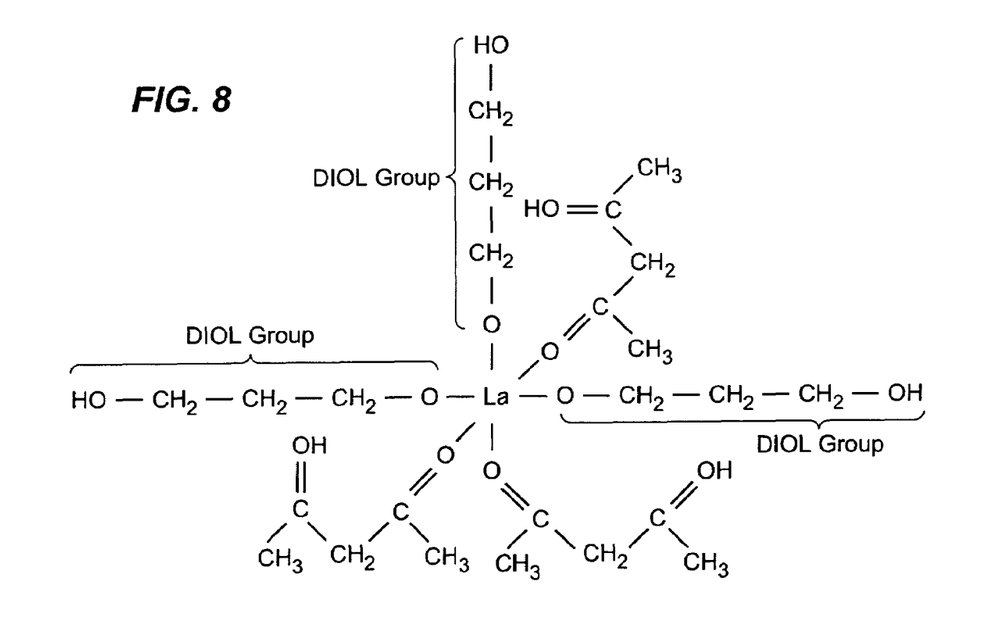
FIG. 8 shows a representation of the general chemical structure (in quasi three-dimensional form) of an exemplary intermediate chelated lanthanum complex formed by an exemplary process according to an aspect of the present invention.

As a next step, the dried lanthanum acetylacetonate was dissolved in 1,3-propanediol (98%, Aldrich) at a molar ratio of 1 to 35 with 3 ml of nitric acid under reflux conditions at a temperature of around the boiling point of 1,3-propanediol (214.4 ° C.) for 30 minutes. The nitric acid, acting as a catalyst, facilitates the dissolving of the lanthanum acetylacetonate in 1,3-propanediol, as explained below. Without being held to any specific theory, the inventors currently believe that at least the following processes occur during the refluxing operation to produce an exemplary intermediate chelated complex shown in FIG. 8 (in quasi three-dimensional form). First, the hydrogen proton (H+) of the nitric acid causes each acetylacetonate group to unbond one of its two oxygen atoms from the lanthanum atom. The hydrogen proton attaches to the newly freed oxygen atom to form a hydroxide group (—OH) at one end of the acetylacetonate group, and the lanthanum atom is left with two sites for coordinate covalent bonding. As the second process, two 1,3-propanediol molecules bond to the two new sites on the lanthanum atom. Each such bond is made at one of the oxygen atoms of the diol, with the hydrogen proton of the O—H bond being released, which completes the proton's role that served as a catalyst. The exemplary intermediate chelated lanthanum complex shown in FIG. 8 results. Because there is an equal possibility of opening any three of the six coordinate sites that the three acetylacetanate groups are attached to, other complex variations are produced during this refluxing step, differing in the positions of the three diol groups relative to the three acetylacetonate groups. Also, due to the complexity of the reaction, it is possible to have only one or two 1,3-propanediol molecules reacted and attached to a lanthanum ion.

Figure 9:
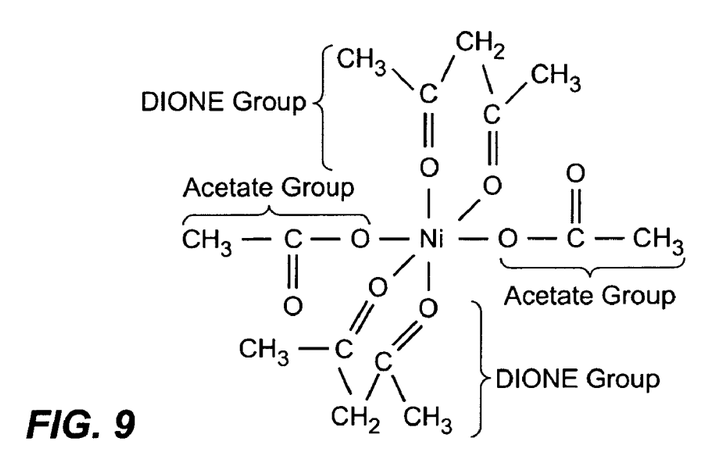
FIG. 9 shows a representation of the general chemical structure (in quasi three-dimensional form) of an exemplary intermediate chelated nickel complex formed by an exemplary process according to an aspect of the present invention.

Also as a next step, dried nickel acetate was refluxed with a mixture of 1:5 volume ratio of 1,3-propanediol and 2,4-pentanedione at a temperature of around the boiling point of 2,4-pentanedione (140.4° C.) for 30 minutes. Without being held to any specific theory, the inventors currently believe that at least the following processes occur during the refluxing operation to produce the intermediate chelated complex shown in FIG. 9 in quasi three-dimensional form. First, each acetate group, which was previously occupying two bonding sites on the nickel atom, opens up and decouples one of its bonds to the nickel atom (at the oxygen atom which was sharing a double bond with both of the nickel and carbon atoms, cf., FIG. 7). Each nickel atom now has four available coordinate covalent bonding sites. As the second process, two 2,4-pentanedione molecules bond to the four available sites on the nickel atom, each of the 2,4-pentanedione molecules bonding its oxygen atoms to two adjacent sites on the nickel atom. These molecules are denoted as "Dione Groups" in the figures. The exemplary intermediate chelated nickel complex shown in FIG. 9 results. Other complex variations are produced during this refluxing step, such as complexes where 1,3 propanediol molecules may be attached to the nickel ion during the reflux condition.

Figure 10:
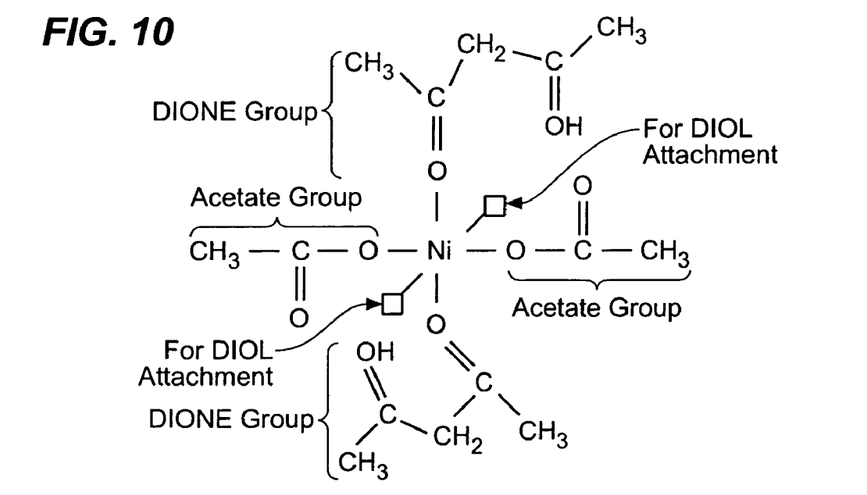
FIG. 10 shows a representation of the general chemical structure (in quasi three-dimensional form) of another exemplary intermediate chelated nickel complex formed by an exemplary process according to an aspect of the present invention.
Figure 11:
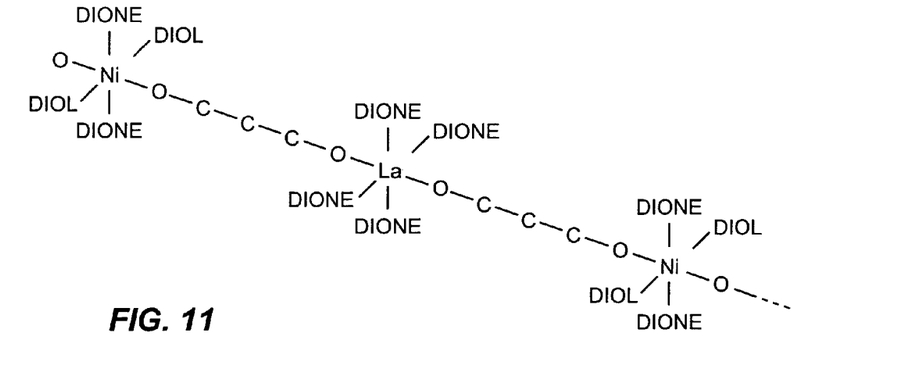
FIG. 11 shows a representation of the chemical structure (in quasi three-dimensional form) of an exemplary chelated complex comprising nickel atoms, lanthanum atoms, and diol compounds (a precursor for forming a LaNiO$_3$ layer) formed by an exemplary process according to an aspect of the present invention.

After the above two refluxing steps have been completed, which may be done in any order or simultaneously, two non-opaque solutions were obtained. The two solutions were then mixed and refluxed at a temperature of around the boiling point of 2,4-pentanedione (140.4° C.) for 60 minutes. Without being held to any specific theory, the inventors currently believe that at least the following processes occur during this third refluxing operation. First, initially referring to FIG. 9, the hydrogen proton (H+) from the nitric acid left over in the lanthanum complex solution causes each dione group in the intermediary nickel complex to unbond one of its two oxygen atoms from the center nickel atom, thereby opening up two sites for coordinate covalent bonds. The intermediary molecule is shown in FIG. 10. Excess diol molecules (i.e., those which have not been incorporated into complexes) in the solution attach to these free sites on the nickel atom. Next, the diol groups of the intermediate chelated lanthanum complex (FIG. 8) have free OH ends (moieties), which react with the acetate groups in the nickel complex (FIG. 10) to form an —O—C—C—C—O— link between adjacent nickel and lanthanum complexes, as shown in FIG. 11. (Each carbon atom in the link 13 O—C—C—C—O— preferably has two hydrogen atoms bonded to itself.) Because the intermediary nickel complex shown in FIG. 10 only has two sites with acetate groups, the reaction between the intermediary nickel complex and the intermediate lanthanum complex tends to form linear chains of chelated molecules (FIG. 11), each of which can substantially lie flat on a two-dimensional plane. While a straight chain has been shown in FIG. 11, some of the chains will have 90-degree bends in the chains or form into a 3-dimensional network consisting of entangled linear molecules if the diol groups in the lanthanum complex (FIG. 8) are at a 90-degree angle relative to one another, or if more than two diol groups exist in the lanthanum complex (FIG. 8) and are at a relative location of 90-degrees to one another. In addition, free diol molecules in the reflux solution can react with the acetate groups in the nickel complex (FIG. 10), which tends to limit the length of the chains.

After the second reflux operation, a dark green solution resulted. The solution had a concentration of approximately 0.18 M.

The solution was then dispensed on test substrates according to the method outlined above. Two types of substrates were used to compare the resulting film properties: (1) lanthanum aluminum oxide ($LaAlO_3$, <001> oriented, 2-side polished, 50 mm diameter, MTI Crystal), and (2) strontium titanium oxide ($SrTiO_3$, <100> oriented, 2-side polished, 25 mm diameter, MTI Crystal). The La—Ni complex solution was filtered through a 0.45 μm-sized filter (polyvinylidene fluoride, PVDF, Whatman), and then dispensed on the test substrates. The substrates were spun at a speed of 1500 rpm for 60 seconds. The substrates were then subjected to heat treatment within a rapid thermal process furnace (RTP) with quartz chamber under oxygen flow. The heating profile has a one-minute pre-bake step at 350° C., and a 15-minute firing step at 850° C. All of the samples were coated and fired a second time under the above conditions.

The sheet resistance of the layers was measured by 4-point probe method at five different positions. The resistivity was calculated from film thickness, sheet resistance, and 4-point-probe geometrical factors based on sample shape and probe gap. Atomic force microscopy was used to observe the surface morphology, roughness Ra and thickness of the $LaNiO_3$ films. X-ray diffractometry (XRD-Philips Norelco) for phase identification, preferred orientation and crystallite grain size (average diameter) was performed by a wide-angle powder diffractometer using Cu Kα radiation. The results of these measurements are provided in the first three columns of Table I. The crystal orientations of the $LaNiO_3$ layers were highly oriented to the orientation of the underlaying substrate. The $LaNiO_3$ layers have relatively large crystal grain sizes (average diameters) of 180 Å to 250 Å, and have lattice constants that are almost identical to the lattice constants of the substrates (3.905 Å for $SrTiO_3$, and 3.84 Å for $LaAlO_3$). The surface roughness Ra was measured to be 2.8 nm and 2.9 nm for $LaNiO_3$ layers formed on $SrTiO_3$ and $LaAlO_3$ substrates, respectively, which are very good for building subsequent layers on. In addition, the resistivities were very good at 312 μΩ·cm and 237 μΩ·cm for $LaNiO_3$ layers formed on $SrTiO_3$ and $LaAlO_3$ substrates, respectively (1 μΩ=1×10$^{-6}$ Ω).

TABLE I

| Parameter/ Property | Invention Example #1 | Invention Example #2 | Comparative Example #1 | Comparative Example #2 |
|---|---|---|---|---|
| Substrate | $SrTiO_3$ | $LaAlO_3$ | $SrTiO_3$ | $LaAlO_3$ |
| Chelating Solvent | Diol | Diol | MOE | MOE |
| Crystal Orientation | (100) textured | (100) textured | (100) textured | (100) textured |
| Crystal Grain Size (Å) (Average diameter) | 180 ± 10 | 250 ± 10 | 150 ± 10 | 200 ± 10 |
| Lattice Constant (Å) | 3.836 ± 0.003 | 3.843 ± 0.003 | 3.839 ± 0.003 | 3.843 ± 0.003 |
| Roughness Ra (nm) | 2.8 | 2.9 | 3.0 | 4.0 |
| Layer Thickness (nm) | 45 | 45 | 45 | 45 |
| Resistivity (μΩ · cm) (1 μΩ = 1 × 10$^{-6}$ Ω) | 312 ± 16 | 237 ± 5 | 478 ± 13 | 301 ± 10 |

COMPARATIVE EXAMPLES 1 AND 2

A second lanthanum-nickel-oxide precursor solution was prepared using 2-methoxyethanol (MOE), which only has a single OH group, instead of 1,3-propanediol (diol). MOE has the structure of CH3-O—CH2-CH2-OH. Lanthanum acetylacetonate hydrate (Aldrich) and nickel acetate tetrahydrate (98%, Aldrich), in a 1:1 molar ratio to one another, were separately dried at 75° C. for 8 hours under vacuum. The dried lanthanum acetylacetonate was refluxed with a mixture of 2,4-pentanedione (99+%, Aldrich) and 2-methoxyethanol (99.8%, anhydrous, Aldrich) at a 1:2.5 volume ratio, the refluxing being done at a temperature of around the boiling point of 2-methoxyethanol (125° C.) for 60 minutes. The dried nickel acetate was refluxed with a mixture of 2,4-pentanedione and 2-methoxyethanol at a 1:2 volume ratio for the same period of time as the lanthanum solution, and at the same approximate temperature. The lanthanum solution and the nickel solution were mixed together and then refluxed at a temperature of around the boiling point of 2-methoxyethanol (125° C.) for 2 hours. The resulting dark green solution had a concentration of 0.18M.

This solution, which we will call the "comparative solution," was then dispensed on test substrates according to the method outlined above. Two types of substrates were used to compare the resulting film properties: (1) lanthanum aluminum oxide ($LaAlO_3$, <001> oriented, 2-side polished, 50 mm diameter, MTI Crystal), and (2) strontium titanium oxide ($SrTiO_3$, <100> oriented, 2-side polished, 25 mm diameter, MTI Crystal). The comparative solution was filtered through a 0.45 μm-sized filter (polyvinylidene fluoride, PVDF, Whatman), and then dispensed on the test substrates. The substrates were spun at a speed of 1500 rpm for 60 seconds. The substrates were then subjected to heat treatment within a rapid thermal process furnace (RTP) with quartz chamber under oxygen flow. The heating profile has a one-minute pre-bake step at 350° C., and a 15-minute firing step at 850° C. All of the samples were coated and fired a second time under the above conditions.

These layers of the comparative examples were analyzed in a manner similar to the analysis of the layers provided by the present invention. There was no substantive difference in the lattice constants between the Invention Examples and the Comparative Examples. In addition, the Comparative Examples had $LaNiO_3$ layers that were also highly oriented to the orientations of the underlaying substrates. However, the comparative examples had smaller crystal sizes of 150 Å to 200 Å, and larger surface roughness Ra's of 3 nm and 4 nm for $LaNiO_3$ layers formed on $SrTiO_3$ and $LaAlO_3$ substrates, respectively. More importantly, the resistivities of the comparative examples were significantly higher at 478 μΩ·cm and 301 μΩ·cm for $LaNiO_3$ layers formed on $SrTiO_3$ and $LaAlO_3$ substrates, respectively, approximately 52% and 27% higher, respectively (1 μΩ=1×10$^{-6}$ Ω).

The roughness of the comparative examples (MOE) was larger than the roughness of the invention examples (diol). Under Atomic Force Microscope (AFM), the surface of the $LaNiO_3$ layers of the comparative examples, either on $SrTiO_3$ or $LaAlO_3$ substrates, showed round granular-particle stacks, as shown FIGS. 12C and 12D, which show exemplary line profiles along three separate cross-sections of the layer. In contrast, the surface of the $LaNiO_3$ layers of the invention examples showed well-connected granular features with cavities, as shown in corresponding line profiles of FIGS. 12A and 12B. It is believed that these round granular-particle stacks in the comparative solutions reduce the grain sizes of the comparative examples, whereas the long-chain complex molecules of the inventive solution increases the grain size. Increased grain size results in reduced resistivity of the $LaNiO_3$ layer.

Figure 12A:
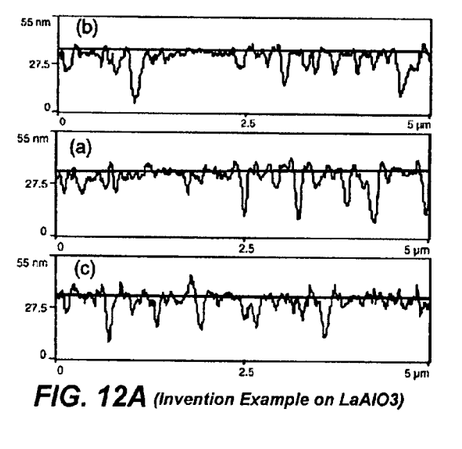
FIGS. 12A and 12B show exemplary line profiles along three separate cross-sections of a LaNiO$_3$ layer formed by an exemplary process according to the present invention.
Figure 12B:
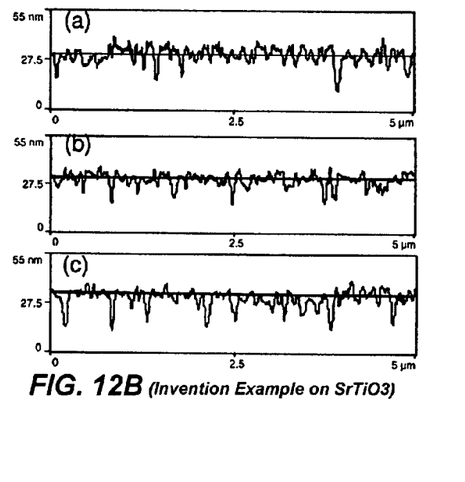
Figure 12C:
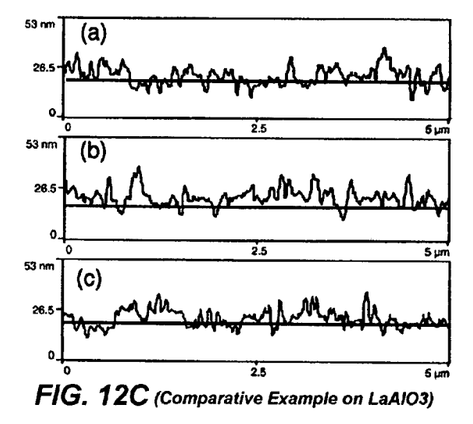
FIGS. 12C and 12D show exemplary line profiles along three separate cross-sections of the LaNiO$_3$ layer formed by a comparative process.
Figure 12D:
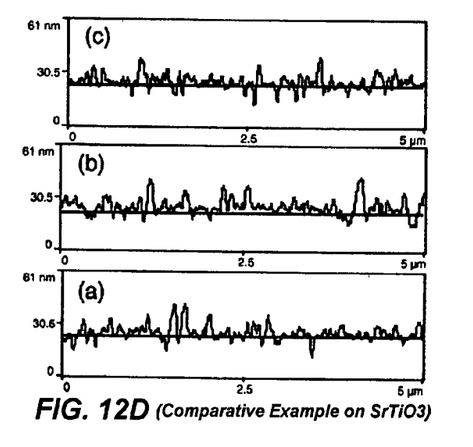

The line profile analysis can depict this phenomenon in a qualitative way. In FIGS. 12C and 12D, each of the line profiles for the $LaNiO_3$ layers of the comparative examples has a baseline at the bottom, and the deviations from granular particles are above the baseline. The roughness of these films was contributed from the extrusion height of the granular particles. For both $SrTiO_3$ and $LaAlO_3$ substrates, each of the $LaNiO_3$ layers of the invention examples has a different profile than those of the comparative examples, as illustrated in FIGS. 12A 22B. Each of these line profiles shows a valley-rich profile, where most of the deviations are below the baseline. The roughness value of this film was mostly contributed from the recess depth of the cavities on the film.

Figure 13A:
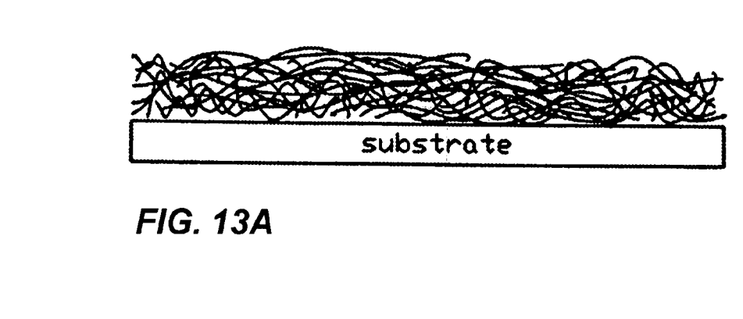
FIGS. 13A and 13B are conceptual drawings of the complex molecules of a precursor solution according to the present invention before pre-baking and after pre-baking.
Figure 13B:
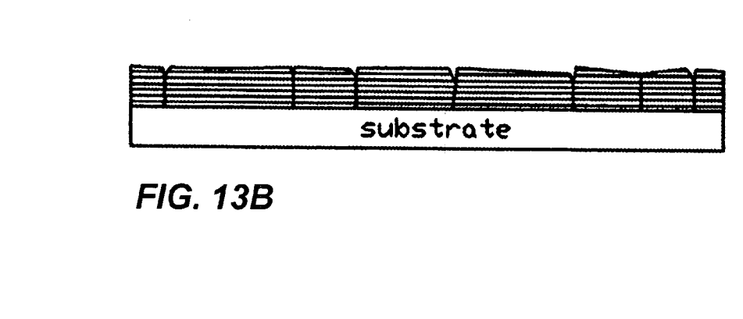
Figure 13C:
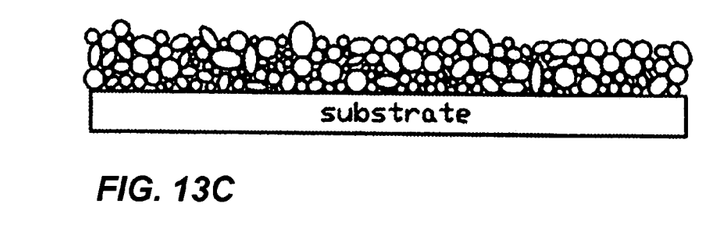
FIGS. 13C and 13D are conceptual drawings of the complex molecules of a precursor solution according to a comparative example before pre-baking and after pre-baking.
Figure 13D:
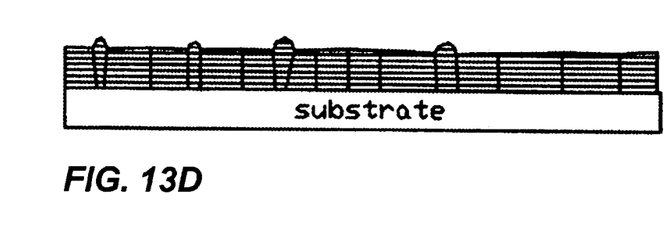

The inventors believe that these difference in surface morphology can be explained by the molecule distributions of lanthanum and nickel in the solutions that are dispensed on the substrates. MOE has only one functional OH group that may react with the metal ions during precursor synthesis. The multiple coordination number in the transition metal ions provides the sites to open up the molecule structure and grow the molecule into large size. The inventors believe that the solvent molecule, 2-methoxyethanol, with its single functional group, tends to close up the open structure of the metal-organic molecule. Thus, the resulting precursor solution contains an agglomerate type of molecule clusters (i.e., round aggregated clusters) that is suspended and stabilized within the solution. On the other hand, the diol molecule used by the invention examples has two functional groups (OH) at both ends of the molecule, which provides the capability to link metal ions at both of its ends. Due to this characteristic, the resulting molecule within the precursor of the invention has long a chained structure. These long molecule chains are stabilized within the solution, and are totally different from the complex molecules formed in the comparative solutions. When these precursor solutions are coated on substrates and dried, the resulting pre-fired layers will form different morphologies, which are inherited from their suspension state. A conceptual drawing of this effect is illustrated in FIGS. 13A–13D, where FIGS. 13A and 13C show the dispensed precursor solutions of the invention example and comparative example before pre-baking (removal of solvents), respectively, and where FIGS. 13B and 13D show the dispensed precursor solutions of the invention example and comparative example after pre-baking. After the molecules were deposited on the substrate and the solvents removed, the residual components preserved the original arrangement of the complex molecules. During the subsequent firing step where the organic compounds are decomposed and crystallization of the layers occurs, the metal ions (lanthanum and nickel) and the oxygen atoms are localized to the substrate lattice where the nucleus is initiated. The supplement of heat from the process was not enough to accelerate the grain growth, which prevents the crystallization process from homogenizing the arrangement inherited from the precursor solution. Thus, the resulting layers from different precursor solvents have distinguished surface morphology, which contributes to the differences in their characteristics.

While the present invention has been practiced with 1,3-propanediol, it may be appreciated that other diols may be used, such as 1,4-butanediol, 1,5-pentanediol, and 1,6-hexanediol. As used herein and in the claims, the term "diol" has its ordinary and customary meaning in the chemical art, that of any alcohol molecule having two hydroxyl groups. At present, the inventors prefer to practice the invention with linear diols that have their hydroxyl groups positioned on the linear molecule as far a part from one another as possible. As used herein, linear diol has its ordinary and customary meaning in the chemical arts, and includes diols that comprise a linear backbone of carbon atoms. While the above examples have used the same diol for each of the initial dissolving processes, it may be appreciated that a first diol (or first mixture of diols) may be used for the initial dissolving of lanthanum acetylacetonate, and that a second and different diol (or second and different mixture of diols) may be used for the initial dissolving of nickel acetate.

Referring back to FIG. 2, a device according to the present has been constructed comprising a lanthanum nickel oxide ($LaNiO_3$) layer formed over a substrate, a layer of ferro-electric material (e.g., PLZT) formed over the lanthanum nickel oxide layer, and top electrode formed over the ferro-electric material. The lanthanum nickel oxide layer has a non-amorphous microstructure that comprises grains of crystalline material, with the grains having an average diameter ranging from 100 Å to 300 Å. The lanthanum nickel oxide layer has an average surface roughness in the range from 2 nm to 3 nm. The lanthanum nickel oxide layer has a resistivity of less than 330 $\mu\Omega\cdot cm$, and can readily achieve a resistivity of less than 300 $\mu\Omega\cdot cm$. The resistivity is preferably less than 250 $\mu\Omega\cdot cm$, and can be less than 240 $\mu\Omega\cdot cm$. The top electrode layer may comprise a bottom layer of tungsten (W), and may further comprise a top layer of gold (Au) over the tungsten layer.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A device comprising:
   a substrate;
   a lanthanum nickel oxide ($LaNiO3$) layer formed over the substrate, said lanthanum nickel oxide layer having a non-amorphous microstructure that comprises grains of crystalline material, the grains having an average diameter in the range from 100 Å to 300 Å, said lanthanum nickel oxide layer further having a resistivity of less than 330 $\mu\Omega\cdot cm$; and
   a layer of ferro-electric material formed over said lanthanum nickel oxide layer.

2. The device of claim 1 wherein the lanthanum nickel oxide layer has an average surface roughness in a range from 2 nm to 3 nm.

3. The device of claim 1 wherein the lanthanum nickel oxide layer has a resistivity of less than 300 $\mu\Omega\cdot cm$.

4. The device of claim 1 wherein the lanthanum nickel oxide layer has a resistivity of less than 250 $\mu\Omega\cdot cm$.

5. The device of claim 1 wherein the grains of the crystalline material of the lanthanum nickel oxide layer have a crystal lattice constant that is closely matched to the crystal lattice constant of the substrate.

6. A device comprising:
   a substrate;
   a lanthanum nickel oxide ($LaNiQ_3$) layer formed over the substrate, said lanthanum nickel oxide layer having a non-amorphous microstructure that comprises grains of crystalline material, the grains having an average diameter in the range from 100 Å to 300 Å, wherein the grains of the crystalline material of the lanthanum nickel oxide layer have a crystal lattice constant that is closely matched to the crystal lattice constant of the substrate, said lanthanum nickel oxide layer further having an average surface roughness in a range from 2 nm to 3 nm; and
   a layer of ferro-electric material formed over said lanthanum nickel oxide layer.

7. The device of claim 6 wherein the lanthanum nickel oxide layer has a resistivity of less than 330 $\mu\Omega\cdot cm$.

8. The device of claim 6 wherein the lanthanum nickel oxide layer has a resistivity of less than 300 $\mu\Omega\cdot cm$.

9. The device of claim 6 wherein the lanthanum nickel oxide layer has a resistivity of less than 250 $\mu\Omega\cdot cm$.

* * * * *

UNITED STATES PATENT AND TRADEMARK OFFICE
CERTIFICATE OF CORRECTION

| | | |
|---|---|---|
| PATENT NO. | : 7,083,869 B2 | Page 1 of 1 |
| APPLICATION NO. | : 10/807605 | |
| DATED | : August 1, 2006 | |
| INVENTOR(S) | : Liu et al. | |

It is certified that error appears in the above-identified patent and that said Letters Patent is hereby corrected as shown below:

At column 14, line 25, "LaNiO3" should be -- $LaNiO_3$--.

Signed and Sealed this

Seventeenth Day of October, 2006

JON W. DUDAS
*Director of the United States Patent and Trademark Office*